United States Patent
Okamoto et al.

[15] 3,654,487
[45] Apr. 4, 1972

[54] DIGITAL-ANALOG CONVERTER CIRCUIT

[72] Inventors: Atutoshi Okamoto, Toyohashi; Shunji Okumura, Kariya, both of Japan

[73] Assignee: Nippondenso Kabushiki Kaisha, Aichi-ken, Japan

[22] Filed: May 6, 1970

[21] Appl. No.: 35,126

[30] Foreign Application Priority Data

May 9, 1969 Japan....................................44/34664
Nov. 19, 1969 Japan....................................44/93279

[52] U.S. Cl..............................................307/227, 307/261
[51] Int. Cl. ..........................................................H03k 7/00
[58] Field of Search...................307/228, 225, 261, 227, 246; 328/186, 184

[56] References Cited

UNITED STATES PATENTS 3,207,923  9/1965  Prager...............................328/186 X Primary Examiner—Donald D. Forrer
Assistant Examiner—B. P. Davis
Attorney—Cushman, Darby & Cushman

[57] ABSTRACT

A digital-analog converter circuit wherein in a pulse interval of input pulses a first capacitor is charged by a power source through a diode, and upon the application of an input pulse the electric charge stored in the said first capacitor is discharged through a grounded-base transistor and simultaneously a second capacitor is charged by the collector current of the said second capacitor is discharged through a resistor in the next pulse interval of the said input pulses.

2 Claims, 10 Drawing Figures

PATENTED APR 4 1972  3,654,487

INVENTORS
ATUTOSHI OKAMOTO
SHUNJI OKUMURA

BY Cushman, Darby & Cushman
ATTORNEYS

DIGITAL-ANALOG CONVERTER CIRCUIT

FIELD OF THE INVENTION

The present invention relates to a digital-analog converter circuit (hereinafter referred to simply as a D-A converter circuit) which is adapted to produce a DC output voltage directly proportional to the number or the frequency of input pulses, and the present invention aims at providing a cheap D-A converter circuit of simple construction which produces a DC output voltage which is exactly and directly proportional to the number or the frequency of input pulses and is stable against variation in the ambient temperature.

BRIEF DESCRIPTION OF THE DRAWING

FIG. 2a shows a characteristic curve of the conventional circuit shown in FIG. 1a.

FIG. 4a shows a characteristic curve of the circuit embodying the present invention shown in FIG. 3a.

FIG. 5a is a connection diagram showing another accumulating type D-A converter circuit which is a third embodiment of the present invention and a modification of the said first embodiment shown in FIG. 3a.

In the above-mentioned drawings, identical reference numerals designate the same or equivalent components.

DESCRIPTION OF THE PRIOR ART

Figure 1A:
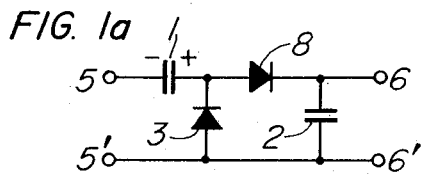
FIG. 1a is a connection diagram showing a conventional well-known accumulating type D-A converter circuit.

An example of a conventional well-known D-A converter circuit of this kind is shown in FIG. 1a.

In FIG. 1a, numerals 1 and 2 designate a first and second capacitors, 3 and 8 diodes, 5 and 5' input terminals, 6 and 6' output terminals. The input terminal 5' and the output terminal 6' are held at ground potential.

The operation of the circuit of the above-mentioned construction will be described hereunder. Now, suppose that both the first capacitor 1 and the second capacitor 2 initially store no electric charge therein. Under that condition, when a negative pulse having a peak voltage value of $E$ (volt) is applied between the input terminals 5 and 5', the diode 3 becomes conductive, the diode 8 becomes nonconductive and the first capacitor 1 is charged through the diode 3 to have the polarity as shown in FIG. 1a. If the charging time constant is made sufficiently small as compared with the width of the input pulse, the terminal voltage of the said first capacitor 1 becomes $E$ (volt). Then, when the input pulse vanishes and the voltage between the input terminals 5 and 5' returns to zero (volt), the diode 3 becomes nonconductive, the diode 8 becomes conductive, and the second capacitor 2 is charged by the charge stored in the first capacitor 1, thereby producing a DC voltage having a value of $V_1=(C_1/C_1+C_2)\cdot E$ (volt) across the second capacitor 2, consequently between the output terminals 6 and 6', where $c_1$ and $C_2$ are respectively capacitances (farad) of the first capacitor 1 and the second capacitor 2. And in describing the operations of the second and subsequent input pulses, taking into consideration that the second capacitor 2 has already been charged by the preceding input pulses, the voltage across the second capacitor 2, i.e., the output voltage $V_N$ (volt) produced between the output terminals 6 and 6' is given by:

$$V_N = E[1-(C_2/C_1+C_2)^N] \quad (1)$$

Figure 2A:
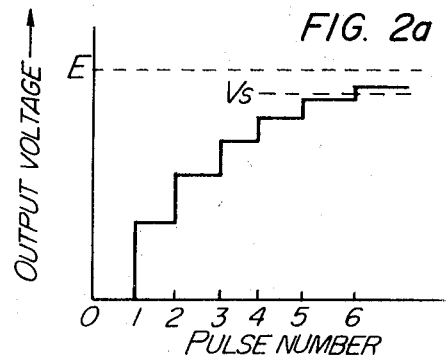

As apparently seen from the above expression, the output voltage $V_N$ is not directly proportional to the number $N$ of the input pulses, whereas its increments become smaller as the number $N$ of the input pulses becomes larger. The relation of the above expression (1) is shown in FIG. 2a. Suppose now, for example, that an accumulating type D-A converter circuit shown in FIG. 1a is followed by and connected to a voltage comparator circuit and a discharge circuit (a reset circuit) and that the set voltage $v_S$ (volt) of the said voltage comparator circuit is chosen within the range of:

$$V_5 < V_S < V_6 \quad (2)$$

where $V_5$ and $V_6$ are the respective output voltages produced between the output terminals 6 and 6' when five and six input pulses are applied to the input terminals. In this case, when the sixth input pulse is applied to the input terminals, the output voltage $v_N$ of the accumulating type D-A converter circuit exceeds the set voltage $V_S$ of the voltage comparator circuit and the voltage comparator circuit produces one output pulse, at the same time the electric charge stored in the second capacitor 2 is discharged through the discharge circuit to thereby reset the output voltage $V_N$ of the accumulating type D-A converter circuit to zero (volt). Thus, if the relation of the above expression (2) is determined, the combination of the accumulating type D-A converter circuit, the voltage comparator circuit and the discharge circuit operates as a hexonal counter circuit.

However, in the aforesaid conventional accumulating type D-A converter circuit, the output voltage $v_N$ produced between the output terminals 6 and 6' is not directly proportional to the number of the input pulses, whereas the output voltage increment becomes smaller as the number of the input pulses becomes larger. Therefore, even a slight variation in the peak voltage value of an input pulse or the set voltage $V_S$ of the voltage comparator circuit tends to cause an error.

As a method for eliminating the above-mentioned error, it is well-known that the capacitances of the first capacitor 1 and the second capacitor 2 should be chosen to satisfy the relation $C_1 \ll C_2$, whereby the following expression holds:

$$V_N \doteqdot E \cdot \frac{C_1}{C_2} \cdot N \quad (3)$$

It shows that the output voltage $V_N$ is directly proportional to the number $N$ of the input pulses. However, as the relation $C_1 \ll C_2$ is well satisfied, any increment of the output voltage $V_N$ for each one input pulse becomes remarkably small, hence it will be necessary to increase the peak voltage value $E$ of an input pulse thereby introducing a new problem of being impracticable. Hence, a second measure is generally taken to leave the output voltage $V_N$ in the small value state and amplify it to have a desired voltage level by means of a DC amplifier. However, this method has such drawbacks that an expensive DC amplifier must be employed and that in an ordinary DC amplifier the amplification degree tends to be varied due to variations in the ambient temperature and a variation with time (drift) etc. also cannot be ignored thereby causing a variation in the output voltage.

Figure 1B:
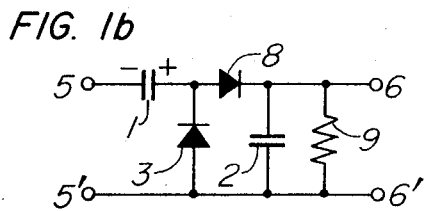
FIG. 1b is a connection diagram showing a conventional well-known frequency-voltage conversion type D-A converter circuit.

Now, another example of a conventional well-known D-A converter circuit of this kind is shown in FIG. 1b.

Similarly to the case of FIG. 1a, a negative pulse having a peak voltage value of $E$ (volt) which is initially applied between the input terminals 5 and 5' causes a DC output voltage having a value of $$V_1 = (C_1/C_1+C_2)\cdot E \quad \text{(volt)}$$

to appear across the second capacitor 2, consequently between the output terminals 6 and 6'. In this case, however, at the same time when another negative pulse is again applied between the input terminals 5 and 5' to make the diode 3 conductive, the diode 8 nonconductive and the first capacitor 1 be charged to have a voltage of $E$(volt), the electric charge of the capacitor 2 is discharged through a resistor 9. If the discharge starting time is taken at $t=0$, the terminal voltage $V$ of the second capacitor 2 is expressed by the following expression by employing an exponential function exp:

$$V = V_1 \cdot \exp\left(-\frac{t}{C_2 R}\right) \text{ (volt)} \qquad (4)$$

where $t$ denotes time (second), $R$ the resistance value (ohm) of the resistor 9, $V_1$ the terminal voltage (volt) of the first capacitor 1.

Now, if the input pulse frequency is represented by $f$ (Hz) and the period by $T$ (second), when the time $t$ arrives at $t=T$, the input pulse vanishes to thereby make the diode 3 nonconductive, the diode 8 conductive and the second capacitor 2 be charged by the electric charge of the first capacitor 1. Taking into consideration in this case that the second capacitor 2 has been charged to have a voltage of $$V'_2 = V_1 \cdot \exp\left(-\frac{T}{C_2 R}\right)$$

which is obtained by substituting $T$ for $t$ in the above expression (4), the terminal voltage of the second capacitor 2 after it has been recharged is given by:

$$V_2 = (C_1 E + C_2 V'_2 / C_1 + C_2) \text{ (volt)}$$

If the terminal voltage of the second capacitor 2, immediately before the $n$-th input pulse is applied, is generally represented by $V'_n$ and that, immediately after the $n$-th input pulse is applied, by $V_n$, the expression $V'_n = \epsilon V_{n-1}$ holds, where for the sake of simplicity the following substitution is carried out:

$$K_1 = \frac{C_1}{C_1 + C_2}, \quad K_2 = \frac{C_2}{C_1 + C_2} \cdot \exp\left(-\frac{T}{C_2 R}\right) = \epsilon$$

Hence, the above-described $V_1, V_2, \ldots, V_n$ will be represented by:

$$V_1 = K_1 \cdot E$$
$$V_2 = K_1 \cdot E + K_2 \cdot V'_2$$
$$= K_1 \cdot E + K_1 \cdot K_2 \cdot E \cdot \epsilon$$

as a general representation, $$V_n = K_1 \cdot E + K_2 \cdot V'_n$$
$$= K_1 \cdot E + K_2 \cdot \epsilon \cdot V_{n-1}$$
$$= K_1 \cdot E + K_2 \cdot \epsilon \cdot (K_1 \cdot E + K_2 \cdot \epsilon \cdot V_{n-2})$$
$$= K_1 \cdot E (1 + K_2 \cdot \epsilon) + (K_2 \cdot \epsilon)^2 \cdot V_{n-2}$$
$$= K_1 \cdot E (1 + K_2 \cdot \epsilon + K_2^2 \cdot \epsilon^2) + (K_2 \cdot \epsilon)^3 \cdot V_{n-3}$$

$$= K_1 \cdot E \left\{ \frac{1 - (K_2 \cdot \epsilon)^{n-1}}{1 - K_2 \cdot \epsilon} + (K_2 \cdot \epsilon)^{n-1} \right\}$$

$$= K_1 \cdot E \cdot \frac{1 - (K_2 \cdot \epsilon)^n}{1 - K_2 \cdot \epsilon}$$

If $n$ is increased to infinite and $V_f$ represents the limit value of $V_n$, considering the conditions $0 < K_2 < 1$, $0 < \epsilon < 1$, the following will result:

$$\lim_{n \to \infty} (K_2 \cdot \epsilon)^n = 0$$

hence $$V_f = \lim_{n \to \infty} V_n$$
$$= K_1 \cdot E / 1 - K_2 \cdot \epsilon \qquad (5)$$

The voltage $V_f$ which is obtained by the above expression (5) represents the output voltage (volt) produced between the output terminals 6 and 6' when the input pulse frequency $f$(Hz), is in a steady state.

Now, as is known, $$\epsilon = \exp\left(-\frac{T}{C_2 R}\right)$$

$$= 1 - \frac{T}{C_2 R} - \frac{T^2}{2!(C_2 R)^2} - \frac{T^3}{3!(C_2 R)^3} \qquad (6)$$

Hereupon, if it is assumed that the relation $T/C_2 R \ll 1$ holds, i.e., the pulse interval of the input pulses is sufficiently smaller than the time constant $C_2 R$, which means that the input pulse frequency $f$ is sufficiently high, the third and following terms on the right side of the above expression (6) may be neglected, and the above expression (5) may be represented as:

$$V_f = \frac{K_1 \cdot E}{1 - K_2 \left(1 - \frac{T}{C_2 R}\right)}$$

$$= \frac{K_1 \cdot E}{1 - K_2 \left(1 - \frac{1}{C_2 \cdot R \cdot f}\right)} \qquad (7)$$

Figure 2B:
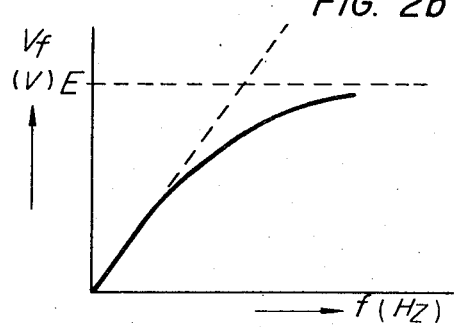
FIG. 2b shows a characteristic curve of the conventional circuit shown in FIG. 1b.

As clarified by the above expression (7) and as shown in FIG. 2b, the output voltage $V_f$ (volt) is not directly proportional to the input pulse frequency $f$(Hz), and the increments of the output voltage $V_f$(volt) become smaller as the input pulse frequency $f$(Hz) goes higher.

In a conventional method, in order to solve such a problem, the capacitances of the first capacitor 1 and the second capacitor 2 are chosen so as the satisfy the condition $C_1 \ll C_2$. In this case, $$K_2 = (C_2 / C_1 + C_2) \doteq 1$$

Then the above expression (7) may be represented as:

$$V_f \doteq \frac{K_1 \cdot E}{1 - \left(1 - \frac{1}{C_2 \cdot R \cdot f}\right)}$$

$$= K_1 \cdot C_2 \cdot R \cdot f \cdot E$$

$$= \frac{C_1 \cdot C_2}{C_1 + C_2} \cdot R \cdot f \cdot E$$

$$\doteq C_1 \cdot R \cdot f \cdot E \qquad (8)$$

which shows that the output voltage $V_f$ (volt) is directly proportional to the input pulse frequency $f$ (Hz). However, the better the condition $C_1 \ll C_2$ is satisfied UNDER A given value of $C_2$, the smaller will become the increments of the output voltage $V_f$ for each one input pulse, hence there arises a problem similar to that described in connection with FIGS. 1a and 2a that the peak voltage value $E$ of the input pulses must be made larger thereby bringing about practical difficulties. That is, a second measure should be generally taken to amplify the original small output voltage $V_f$ to have a desired voltage level by means of a DC amplifier, which cannot be free from the various defects as already described.

SUMMARY OF THE INVENTION

The object of the present invention is to provide a D-A converter circuit wherein a grounded-base transistor circuit is employed in place of the diode in order to remove the above-descirbed defects so that a DC output voltage produced by a digital-analog conversion, which is directly proportional to the number or the frequency of input pulses and large enough to require no amplification, and which is further not influenced by the ambient temperature, may be obtained.

According to the present invention, in the absence of an input pulse a first capacitor is charged by a power source through a diode, and upon the application of input pulses the electric charge of the said first capacitor is discharged through a grounded-base transistor and simultaneously a second capacitor is charged by the collector current of the said transistor, hence the terminal voltage of the said second capacitor goes up in direct proportion to the number of the input pulses so that a DC output voltage directly proportional to the number of the input pulses can be obtained between both terminals of the said second capacitor. Also, when the ratio between the capacitances of the above two capacitors is suitably chosen, it is possible to raise the maximum value of the DC output voltage to an extent nearer the power source voltage.

In addition to the above-mentioned feature, if the electric charge stored in the said second capacitor is discharged through a resistor, an average value of the terminal voltage of the said second capacitor goes up in direct proportion to the frequency of the input pulses so that an average output voltage directly proportional to the frequency of the input pulses, i.e., an analog DC voltage produced by converting a digital signal into an analog signal can be obtained between both terminals of the said second capacitor. Further, as it is not necessary to make the ratio between the capacitances of the said two capacitors a large value, by suitably selecting the capacitance value of only the said first capacitor the maximum value of the dc output voltage produced by the digital-analog conversion can be raised to an extent nearer the power source voltage.

As described hereinbefore, the present invention has such excellent advantages that it is not necessary to amplify the DC voltage produced by the digital-analog conversion and so it is possible to dispense with an expensive dc amplifier and to greatly cut down the cost, further that a variation in the analog DC voltage due to a variation in the ambient temperature can be avoided, and in addition, according to the circuit of the present invention, the analog output voltage is proportional to a current amplification factor $\alpha$ of the said grounded-base transistor and the current amplification factor $\alpha$ is dispersed within the range of substantially 0.95–0.995, hence a variation in the analog DC voltage can be confined within a very small range even when the said transistor is replaced by another one owing to some fault, etc.

DESCRIPTION OF THE PREFERRED EMBODIMENTS

The present invention will be described hereunder with respect to the embodiments shown in the drawings.

Figure 3A:
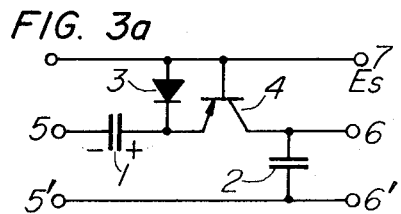
FIG. 3a is a connection diagram showing an accumulating type D-A converter circuit which is a first embodiment of the present invention.

In FIG. 3a which shows a first embodiment of the present invention, circuit components indicated by numerals 1, 2, 3, 5, 5', 6 and 6' are identical with those shown in FIG. 1a. The cathode of the diode 3 is connected to one terminal of a first capacitor 1 and the anode thereof is connected to a positive terminal 7 of a power source. Numeral 4 designates a pnp type transistor, whose emitter is connected to the junction point of one terminal of the first capacitor 1 and the cathode of the diode 3, whose base is connected to the terminal 7 of the power source, and whose collector is connected to one terminal of a second capacitor 2, thereby forming a grounded-base connection. An input terminal 5' and an output terminal 6' are held at ground potential.

Now, the operation of the circuit of the above construction according to the present invention will be described hereunder. At the beginning when the capacitor 2 holds no electric charge, no input signal is applied, and the voltage between input terminals 5 and 5' is zero volt, the first capacitor 1 of the capacitance $C_1$ (farad) is charged by the power source through the diode 3 to have a voltage thereacross reaching the power source voltage $E_S$ (volt) and the polarity as shown in FIG. 3a. In this state, if a positive pulse having a peak voltage value of $E$ (volt) is applied between the input terminals 5 and 5', the diode 3 becomes nonconductive and the first capacitor 1 is discharged through the transistor 4 until the potential difference thereacross becomes $E_S-E$ (volt). If the charging and discharging time constants of the first capacitor 1 are made sufficiently small, the amount of electric charge which is discharged for each one input pulse is given by $C_1E$ (coulomb). As the transistor 4 is connected in a grounded-base configuration, the amount of electric charge which is stored in the second capacitor 2 of capacitance $C_2$ (farad) by a collector current flowing through the transistor 4 is the product of the aforesaid amount of discharged electric charge and the current amplification factor $\alpha$ of the grounded-base transistor 4. Consequently, a voltage produced across the second capacitor 2 for each one input pulse is given by:

$$(C_1/C_2) \cdot \alpha \cdot E \quad \text{(volt)}$$

Then, when $N$ input pulses are applied between the input terminals 5 and 5', an output voltage $V_N$ produced across the second capacitor 2, i.e., between the output terminals 6 and 6' is represented by:

$$V_N = (C_1/C_2) \cdot \alpha \cdot E \cdot N \quad (9)$$

Figure 4A:
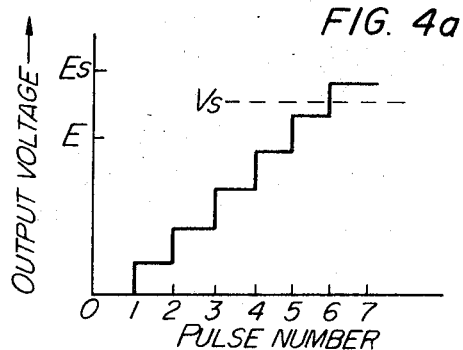

As is apparent from the above expression (9), the output voltage $V_N$ is directly proportional to the number $N$ of the input pulses. The relation of the above expression (9) is shown in FIG. 4a. In FIG. 4a, the horizontal axis is scaled with the pulse number and the vertical axis is scaled with the output voltage, and symbols $E_S$ and $E$ on the vertical axis denote the power source voltage and the peak voltage value of an input pulse respectively. In this case, as there is no need to satisfy the condition $C_1 \ll C_2$, by suitably determining the ratio between $C_1$ and $C_2$ in accordance with the value of the number $N$ of the input pulses, it is possible to make the maximum value of the output voltage $V_N$ reach nearer the power source voltage $E_S$.

Figure 5A:
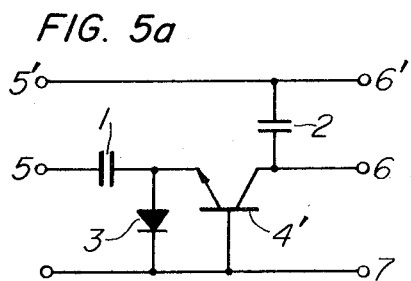

While a PNP type transistor 4 has been employed in the above first embodiment, a NPN type transistor 4' may be employed instead thereof as in the third embodiment shown in FIG. 5a. And, in the same way as the above case of employing a PNP type transistor 4, a DC output voltage which is directly proportional to the number of input pulses applied between the input terminals 5 and 5' can be produced between the output terminals 6 and 6'.

Figure 3B:
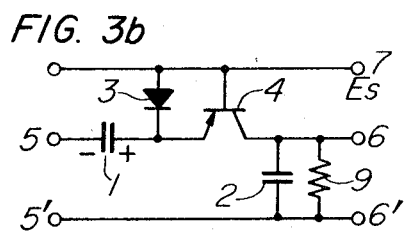
FIG. 3b is a connection diagram showing a frequency-voltage conversion type D-A converter circuit which is a second embodiment of the present invention.

Now, in FIG. 3b which shows a second embodiment of the present invention, circuit components indicated by numerals 1, 2, 3, 5, 5', 6, 6' and 9 are identical with those shown in FIG. 1b. The circuit shown in FIG. 3b has such a construction that a resistor 9 has been connected in parallel with the capacitor 2 in FIG. 3a showing a first embodiment of the present invention.

As explanation will b made of the second embodiment in respect of the difference thereof from the first embodiment shown in FIG. 3a.

When an input pulse disappears after it has been applied to the input terminals, the electric charge stored in the second capacitor 2 is discharged through the resistor 9. If a voltage drop which takes place during one pulse interval $T$ of the input pulses is designated as $\Delta V$ and the peak voltage value of an output pulse as $V_p$, their relation is given by:

$$\Delta V = V_p \cdot \left\{ 1 - \exp\left(-\frac{T}{C_2 \cdot R}\right) \right\}$$

Further, as a voltage rise is equal to a voltage drop in the steady state, the following results:

$$\frac{C_1}{C_2} \cdot \alpha \cdot E = V_p \cdot \left\{ 1 - \exp\left(-\frac{T}{C_2 \cdot R}\right) \right\}$$

hence $$V_p = \frac{\frac{C_1}{C_2} \cdot \alpha \cdot E}{1 - \exp\left(-\frac{T}{C_2 \cdot R}\right)} \quad (10)$$

The above expression (10) gives the peak value $V_p$ of the output voltage, and an average value of the output voltage can be derived therefrom. That is, by averaging the output voltage $V_p$ obtained from the above expression (10) over one period of an input pulse, i.e., over a time $T$, an average output voltage $\overline{V_f}$ will be given by:

$$\overline{V_f} = \frac{1}{T} \int_0^T V_p \cdot \exp\left(-\frac{t}{C_2 \cdot R}\right) dt$$

$$= \frac{1}{T} \cdot V_p \cdot \left[ -C_2 \cdot R \cdot \exp\left(-\frac{t}{C_2 \cdot R}\right) \right]_0^T$$

$$= \frac{1}{T} \cdot C_1 \cdot R \cdot \alpha \cdot E$$

$$= C_1 \cdot R \cdot \alpha \cdot E \cdot f \qquad (11)$$

Figure 4B:
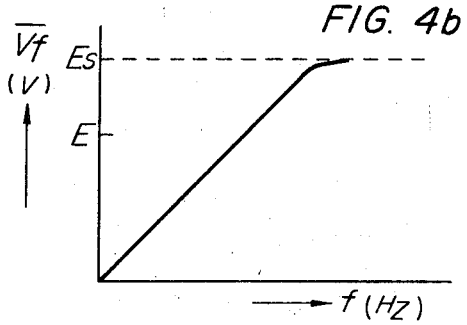
FIG. 4b shows a characteristic curve of the circuit embodying the present invention shown in FIG. 3b.

Thus, the expression which is equivalent to the previous expression (8) can be obtained. However, as apparently seen from the above expression (11), the average output voltage $\overline{V}_f$ is exactly and directly proportional to the frequency $f$ of input pulses. The relation of the above expression (11) is shown in FIG. 4b. In FIG. 4b, the horizontal axis is scaled with he frequency $f$ (Hz) of the input pulses and the vertical axis is scaled with the average output voltage $\overline{V}_f$ (volt), and symbols $e_S$ and $E$ on the vertical axis denote the power source voltage (volt) and the peak voltage value (volt) of an input pulse respectively. In the same way as the first embodiment shown in FIG. 3a, there is no need to satisfy the condition of $c_1 \ll C_2$, by suitably choosing the capacitance $C_1$ of the first capacitor 1, it is possible to make the maximum value of the average output voltage $\overline{V}_f$ reach nearer the power source voltage $E_S$ and independently of the peak voltage value $E$ of an input pulse.

Figure 5B:
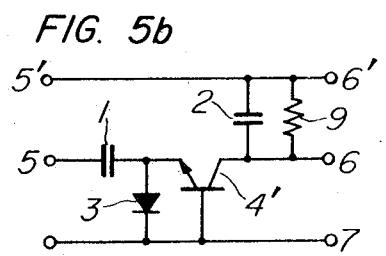
FIG. 5b is a connection diagram showing another frequency-voltage conversion type D-A converter circuit which is a fourth embodiment of the present invention and a modification of the said second embodiment shown in FIG. 3b.

While a PNP type transistor 4 has been employed in the above second embodiment, a npn type transistor 4' may be employed instead thereof as in the fourth embodiment shown in FIG. 5b. And, in the same way as the above case of employing a PNP type transistor 4, an average output voltage which is exactly and directly proportional to the frequency of the input pulses applied between the input terminals 5 and 5' can be produced between the output terminals 6 and 6'.

We claim:

1. A digital-analog converter circuit for converting a train of input digital pulses to an analog output proportional to the number of input pulses, said circuit comprising:
   an input terminal means for receiving said train of input digital pulses,
   a source terminal for connection to a DC power source,
   a series circuit of a first capacitor and a diode connected between said input terminal and said source terminal to result in continuous charging of said first capacitor by said DC power source in the absence of an input pulse,
   output terminals having a second capacitor connected thereacross,
   a transistor with its collector-emitter circuit being connected in series between one of said output terminals and the junction of said first capacitor and diode,
   a base electrode of said transistor being connected to said source terminal whereby a predetermined charging current flows to said second capacitor each time an input pulse is applied to said input terminal.

2. A digital-analog converter circuit as in claim 1 further comprising a resistor means connected across said second capacitor for producing a continuous rather than stepwise output waveform, which continuous waveform is substantially linearly proportional to the input pulse frequency.

* * * * *

UNITED STATES PATENT OFFICE
CERTIFICATE OF CORRECTION

Patent No. 3,654,487              Dated April 4, 1972

Inventor(s) OKAMOTO, Atutoshi and OKUMURA, Shunji

It is certified that error appears in the above-identified patent and that said Letters Patent are hereby corrected as shown below:

In the heading under Foreign Application Priority Date, read "May 9, 1969 Japan....44/34664" as --May 6, 1969 Japan....44/34664--.

Signed and sealed this 5th day of September 1972.

(SEAL)
Attest:

EDWARD M. FLETCHER, JR.          ROBERT GOTTSCHALK
Attesting Officer                Commissioner of Patents